United States Patent [19]

Kim

[11] Patent Number: 5,563,108
[45] Date of Patent: Oct. 8, 1996

[54] RAW BATCH FOR PRODUCING REACTION-BONDED SILICON CARBIDE REFRACTORY PRODUCT

[75] Inventor: Baek H. Kim, North Brunswick, N.J.

[73] Assignee: The Carborundum Company, Niagara Falls, N.Y.

[21] Appl. No.: 450,596

[22] Filed: May 25, 1995

Related U.S. Application Data

[62] Division of Ser. No. 306,087, Sep. 14, 1994, Pat. No. 5,459,112.

[51] Int. Cl.⁶ .................................................. C04B 35/565
[52] U.S. Cl. ........................................................... 501/89
[58] Field of Search .......................................... 501/92, 89

[56] References Cited

U.S. PATENT DOCUMENTS

| | | |
|---|---|---|
| 2,618,565 | 2/1948 | Nicholson . |
| 2,636,828 | 2/1948 | Nicholson . |
| 2,752,258 | 3/1955 | Swentzel . |
| 3,206,318 | 9/1965 | Yamauchi et al. . |
| 3,321,321 | 5/1967 | Abrecht et al. . |
| 3,991,166 | 11/1976 | Jack et al. . |
| 4,113,503 | 9/1978 | Lumby et al. . |
| 4,230,497 | 10/1980 | Schwetz et al. . |
| 4,243,621 | 1/1981 | Mori et al. . |
| 4,476,234 | 10/1984 | Jones et al. .............. 501/92 X |
| 4,506,021 | 3/1985 | Jack et al. . |
| 4,578,363 | 3/1986 | Campos-Loriz . |
| 4,800,181 | 1/1989 | Lassiter et al. . |
| 4,826,791 | 5/1989 | Mehrotra et al. . |
| 4,935,389 | 6/1990 | Umebayashi et al. . |
| 4,990,469 | 2/1991 | Dussaulx et al. .............. 501/92 X |
| 5,132,257 | 7/1992 | Kodama et al. . |
| 5,212,123 | 5/1993 | Schoennahl .............. 501/92 X |
| 5,302,329 | 4/1994 | Shiogai et al. . |
| 5,316,988 | 5/1994 | O'Brien et al. . |
| 5,336,280 | 8/1994 | Dubots et al. . |

FOREIGN PATENT DOCUMENTS 4114969   4/1992   Japan .

*Primary Examiner*—Karl Group
*Attorney, Agent, or Firm*—Bean, Kauffman & Spencer

[57] ABSTRACT

This invention provides a reaction-bonded silicon carbide article having superior abrasion resistance, oxidation resistance and uniformity in which the bond phase comprises appreciable amounts of both silicon oxynitride and alumina. Also provided are a raw batch and a process for producing the reaction-bonded article.

10 Claims, 2 Drawing Sheets

RAW BATCH FOR PRODUCING REACTION-BONDED SILICON CARBIDE REFRACTORY PRODUCT

This is a divisional of application Ser. No. 08/306,087 filed on Sep. 14, 1994, now U.S. Pat. No. 5,459,112.

This invention is in the field of refractory products, especially silicon carbide refractories; more particularly, this invention relates to reaction-bonded silicon carbide refractory articles in which the bond phase contains appreciable amounts of both silicon oxynitride and alumina.

BACKGROUND

Silicon carbide is well known for its high strength, hardness and abrasion resistance. Consequently, it is employed in many applications requiring these properties. Some of the applications in which hardness and abrasion resistance are critical include cyclone separators for mineral processing, burner liners for particulate coal-fired electric power plants, etc. Although these products and processes could probably utilize substantially pure silicon carbide, such products are not available in all the shapes and sizes of interest and are difficult and expensive to produce. Consequently, for many applications, reaction-bonded silicon carbide is employed.

Reaction-bonded silicon carbide comprises a discontinuous silicon carbide grain phase held together within a continuous bond phase matrix produced in situ from the reactants. Bond phases typically found in reaction-bonded silicon carbide include, e.g., silicon nitride, silicon oxynitride and SiAlON.

Silicon carbide bonded with silicon nitride, $Si_3N_4$, yields refractory articles with good abrasion-resistance, and such products have been commercially available for a number of years. For example, U.S. Pat. No. 2,752,258 discloses the use of silicon nitride as the bond phase for silicon carbide. In this disclosure, the silicon carbide grain is held together by intimately mixing it with silicon metal powder and water to produce a mixture moldable into a green body, and then firing the shaped green body in a non-oxidizing, nitrogenous atmosphere at the temperature and for the period of time necessary to convert substantially all the silicon metal to silicon nitride.

U.S. Pat. Nos. 2,618,565, 2,636,828 and 3,206,318 disclose the use of a fluoride, iron powder, vanadium metal or compounds containing vanadium, respectively, as a catalyst for the conversion of silicon metal to silicon nitride in the nitridation reaction. U.S. Pat. No. 4,990,469 describes the production of a silicon nitride-bonded silicon carbide by nitriding a slip castable mixture of silicon carbide, silicon, alumina and iron oxide.

The nitridation reaction between silicon metal, which is a solid at the usual firing temperature, and gaseous nitrogen is heterogeneous, in that the reactants are in separate phases, and the rate of reaction can be determined by the rate of nitrogen diffusion or transport into the solid. Consequently, the composition and physical properties of the reaction-bonded product may be expected to depend to some extent upon variables such as the particle size of the silicon carbide and the porosity of the green body.

The heterogeneous nitridation reaction can also be employed to yield bond phases other than silicon nitride. For example, reaction-bonded silicon carbide in which the major component of the bond phase is silicon oxynitride, $Si_2ON_2$ is produced by nitriding a mixture including particulate silicon carbide, silicon metal powder, and an oxygen source. The resultant refractory articles have very good abrasion resistance. These products are available from The Carborundum Company, Niagara Falls, N.Y., as CAST REFRAX® refractories.

SiAlON is yet another bond phase which is useful for making reaction-bonded silicon carbide with good abrasion resistance. "SiAlON" is an acronym coined to represent the stable solid solutions which result from the replacement of silicon and nitrogen atoms in compounds such as silicon nitride and silicon oxynitride with aluminum and oxygen atoms, respectively. Since some, but not all the silicon and nitrogen atoms are replaced, SiAlON represents, not a single substance, but a range of compositions representing different degrees of replacement. β'-SiAlON is obtained from β-silicon nitride, O'-SiAlon from silicon oxynitride.

SiAlON-bonded silicon carbide can be produced by nitriding a mixture of silicon carbide grain, silicon, an aluminum source, and an oxygen source. For example, U.S. Pat. Nos. 4,243,621; 4,578,363 and 5,302,329 disclose the production of β'-SiAlon-bonded silicon carbide. U.S. Pat. No. 4,506,021 discloses O'-SiAlon ceramic products.

It is known that reaction-bonded silicon carbide articles, including those commercially available, have properties which can depend upon, not only the chemical composition, but also upon the method of fabrication, the particle size distribution in the raw batch, and the porosity of the green body, unless the green body is quite thin. The properties of the ceramic body are believed to be primarily the result of the fact the rate-determining step in the nitridation reaction is the rate of nitrogen gas diffusion into the green body, as pointed out above. Chemical kinetics, rather than thermodynamics, is known to control the outcome of many heterogeneous chemical reactions. On this basis, the following is offered as a nonbinding explanation of how this affects the products obtained from heterogeneous nitridation processes.

The nitriding reaction proceeds from the surface to the interior core of a green body as firing is initiated and continued. This progression is thought to require diffusion of nitrogen gas through voids or pores in the green body, i.e., diffusion and reaction rate depend upon the porosity of the green body. As the nitridation proceeds inward from the surface of the green body, some of the pores near the surface probably become nitrided but remain filled with nitrogen atoms whose progress further into the interior is then blocked by the nitridation products. Thus, the number of voids available for further nitrogen infiltration, diffusion and nitridation decreases.

As a result, the rate of reaction is reduced, and there is most likely unreacted silicon left proceeding from the surface further into the body. This is especially evident in cases in which the green body has a low amount of porosity to start with, particularly at the surface. In addition, the nitridation reaction is exothermic, which introduces additional complications affecting both the nitrogen diffusion rate and the inherent rate of the nitridation reaction.

The gradation in nitridation from the surface into the core of the article becomes even more significant if a plaster mold is used to produce the green body from a slip or other water-containing raw batch. Cast green bodies yield fired articles which are more dense, i.e., less porous, at the surface which contacts the plaster than in the core, because of the capillary action of the plaster at the surface. The plaster tends to draw the water out of the surface first, and transport of water from the interior to the surface to restore equilibrium is impeded in the solid green body. Evaporation of the residual water when the green body is dried and fired leads to additional pores. The lower porosity at the surface of the green body impedes diffusion of nitrogen gas into the body, retards the nitridation reaction, and causes a surface "skin" to be present on the fired reaction-bonded silicon carbide article.

As a result of these nitridation problems, most of the commercially available reaction-bonded silicon carbide products have properties which are not uniform throughout the article. They either have very good abrasion resistance until the "skin" wears through or have marginal abrasion resistance throughout the article. In addition, many of the reaction-bonded silicon carbide products offer relatively poor oxidation resistance in that the abrasion resistance of the product rapidly deteriorates upon exposure of the product to oxidizing conditions at elevated temperatures.

The ideal wear-resistant refractory article should first have superior abrasion resistance. The abrasion resistance should remain high even when the article is exposed for a prolonged period of time to oxidizing conditions at elevated temperatures. In addition, the abrasion resistance of the article should be high, not only within the surface skin, but throughout the material. Indeed, uniformity in both chemical composition and physical properties throughout the refractory article, regardless of its size or shape, is a long sought, but seldom attained goal.

SUMMARY OF THE INVENTION

Although the prior art has produced some reaction-bonded silicon carbide products having good abrasion resistance, the abrasion resistance has often been confined to the surface of an article, or the abrasion resistance has deteriorated dramatically upon exposure of the article to oxidizing conditions, especially at high temperature. Thus, there remains a continuing need for reaction-bonded silicon carbide products having superior properties which can be produced at reasonable cost using commercially available raw materials.

Thus, it is an object of this invention to provide a reaction-bonded silicon carbide refractory article which has abrasion resistance superior to that of benchmark currently available materials. A further objective is the provision of such an article in which the abrasion resistance remains high throughout the bulk of the article. It is a still further objective to provide such an abrasion resistant article which also exhibits very good oxidation resistance. It is also an objective of this invention to provide a reaction-bonded silicon carbide refractory article in which the composition and properties are more uniform throughout than exhibited by benchmark currently available materials.

It is another objective of this invention to provide a raw batch containing commercially available reactants which is useful for the mass production of the aforesaid refractory article.

It is yet another object of this invention to provide a process for making the aforesaid superior reaction-bonded silicon carbide refractory article from the aforesaid raw batch at relatively low cost.

Accordingly, this invention provides a silicon carbide refractory article which is reaction-bonded, the silicon carbide phase comprising about 65 wt % to about 85 wt % of the refractory, the bond phase comprising about 35 wt % to about 15 wt % of the refractory, respectively, the bond phase containing appreciable amounts of both silicon oxynitride and alumina. An "appreciable amount" means at least about 30 wt % of the bond phase in the context of this application, and the term silicon oxynitride, as employed herein, contemplates a mixture of silicon oxynitride and O'-SiAlOn.

The reaction-bonded silicon carbide refractory article of this invention is produced from a raw batch containing solids and a vehicle. The vehicle allows the raw batch to be molded into a green body with a desired shape but is substantially removed from the green body when it is subsequently dried and then fired and is not present in the final reaction-bonded article. The raw batch solids comprise at least about 5 wt % silicon, at least about 5 wt % alumina, and at least about 1 wt % silica, the balance being silicon carbide. The vehicle is added to the solids in sufficient type and quantity to yield a raw batch which can be molded using standard techniques. The raw batch contains between about 1.5 wt % and about 12 wt % vehicle, most of which can be water in certain embodiments of the invention.

The invention, including the manner and means by which it can be carried out will be clarified by reference to the drawings which accompany this specification and to the detailed description which follows.

DETAILED DESCRIPTION

Figure 1:
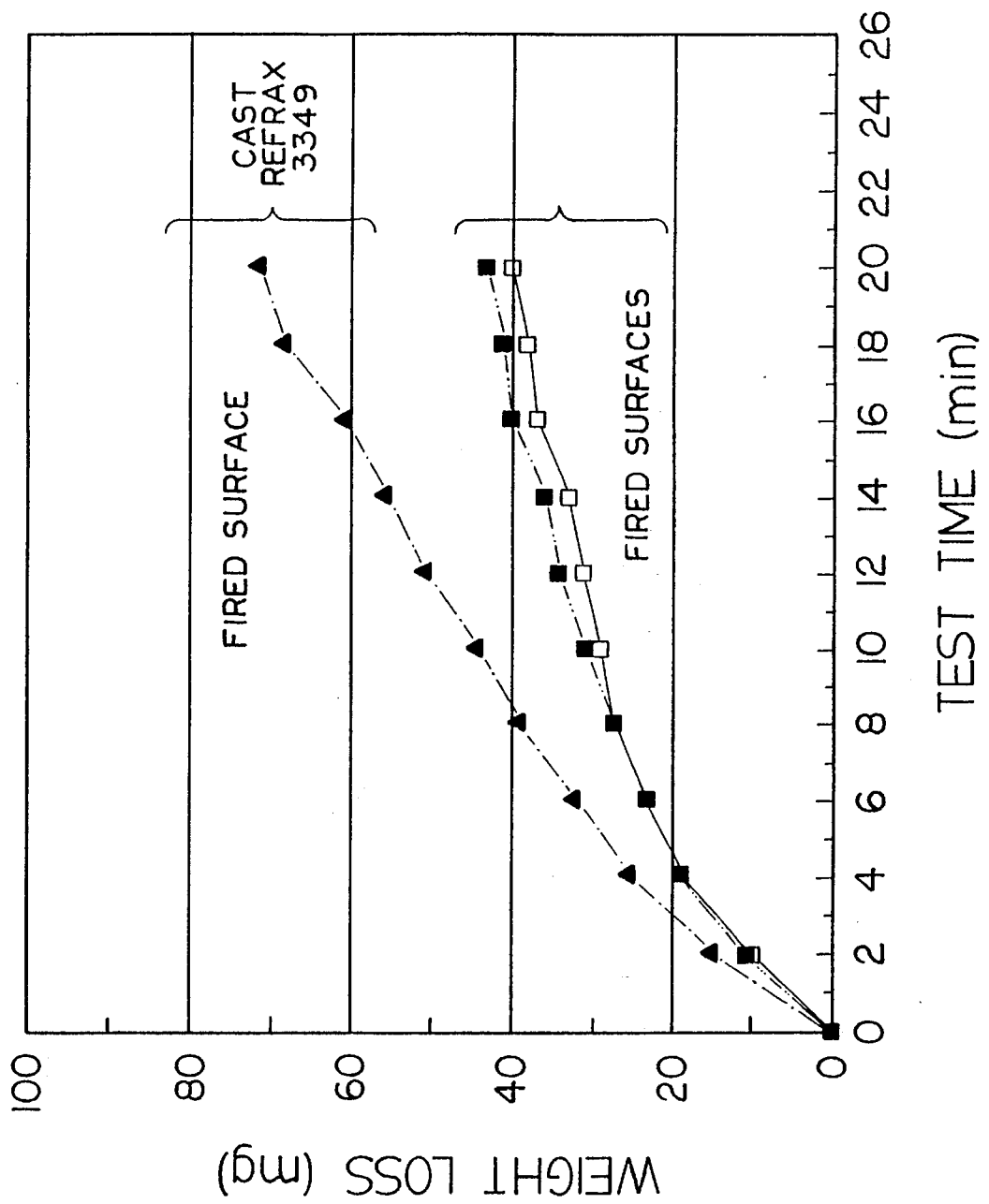
FIG. 1 is a graph showing the abrasion resistance of the fired surfaces of a reaction-bonded silicon carbide article of this invention and a benchmark reaction-bonded silicon carbide article of the prior art.

The raw batch from which the reaction-bonded silicon carbide refractory article of this invention is prepared comprises solids and a vehicle. The solids generally will comprise between about 88 wt % and about 98.5 wt % of the raw batch, the vehicle between about 12 wt % and about 1.5 wt %, respectively. The particle sizes of the solid components should be fine enough so that flowability of the raw batch is ensured and the intended chemical reactions take place at elevated firing temperatures.

The raw batch includes silicon carbide as the principle component. The silicon carbide comprises between about 60 wt % and about 85 wt % of the raw batch solids, preferably between about 65 wt % and about 80 wt %. Either the alpha or the beta silicon carbide polymorph, or mixtures thereof, can be employed and is available in commerce. However, β-silicon carbide has relatively poor oxidation resistance compared with the alpha form. Thus, the alpha polymorph is generally preferred over the beta for that reason and also because of its lower cost.

Although not required, a mixture of silicon carbide grains having different particle sizes is preferably utilized. This facilitates particle packing, thereby reducing porosity and increasing the abrasion resistance of the reaction-bonded product. In general, none of the silicon carbide grain should exceed about 5 mm in size (4 mesh, U.S. Standard Sieve); preferably, the silicon carbide should not exceed about 3.4 mm in size (6 mesh, U.S. Standard Sieve). If larger grain is present, it will tend to settle out of the raw batch and lead to a product which is not homogeneous, especially if the vehicle content of the raw batch is toward the high end of the stated range.

The raw batch solids also contain fine silicon metal, between about 5 wt % and about 16 wt %, preferably between about 7 wt % and about 14 wt %, being present in the raw batch solids. Particle sizes in the range of about 74 micrometers (200 mesh U.S. Standard Sieve) and finer can be utilized.

The raw batch also contains a source of aluminum. Alumina, either the reactive alumina of high surface area or alumina of lower surface area can be employed. Reactive alumina having a surface area of at least about 2 $m^2/g$ is preferred. The alumina will comprise between about 5 wt % and about 14 wt % of the raw batch solids, preferably between about 8 wt % and about 11 wt %. The use of alumina, rather than another aluminum source, such as the metal, is believed to advantageously affect the properties of the raw batch and the refractory articles produced therefrom. When aluminum metal is used as an aluminum source, for example, there is a reaction between the aluminum and an aqueous vehicle, even at room temperature, which yields a gas. The presence of this gas can prove to be troublesome in commercial processes; the gas leads to voids in the product, lower product density, and less than optimum abrasion resistance, for example.

Silica comprises between about 1 wt % and about 7 wt % of the raw batch solids, preferably between about 2 wt % and about 4 wt %. Although any of the silica polymorphs in powder form will suffice, the silica is preferably "fume" silica which is amorphous and available, for example, as "Microsilica EMS" of fine particle size having a surface area of 20–24 $m^2/g$ from Elken Corp., Pittsburgh, Pa. The use of silica, in addition to silicon metal, as the source of silicon is believed to favorably affect the course of the nitridation reaction, as well as fabrication of the refractory articles of this invention.

In addition to the solids, the raw batch also comprises between about 1.5 wt % and about 12 wt % vehicle, depending upon whether the raw batch is intended to be cast, poured into a mold, pressed, or extruded, techniques for shaping a green body which are well known to those skilled in the art. The raw batch can include water and can also contain various additives in small amounts. Such additives include, for example, binders, surfactants, deflocculants and small amounts of acid or base to regulate the pH. A preferred deflocculant is DARVAN brand sodium polyelectrolyte, sold by R. T. Vanderbilt Co., Norwalk, Conn.

If the raw batch is to be cast, an aqueous vehicle, constituting between about 4 wt % and about 7 wt % of the raw batch, preferably about 5 wt % of the raw batch, can be utilized. Greater amounts of the aqueous vehicle can be employed if the raw batch is to be poured into a mold. If the raw batch is intended to be shaped by pressure or extrusion, a temporary binder will generally be present and can constitute between about 2 wt % and about 7 wt % of the raw batch, preferably about 4 wt % of the raw batch. Suitable temporary binders are well known to those skilled in the art and include lignone, dextrin and poly(vinyl alcohol), for example.

The raw batch solids and the vehicle are blended together in a mixer, such as is available from Hobart Corp., for example. After blending, the raw batch can be cast, poured or pressed into a plaster mold or a non-porous mold. The resultant green body is removed from the mold, dried and then fired at one or more temperatures within the range of about 1300° C. to about 1500° C., e.g., at about 1400° C., which is well below the sintering temperature of silicon carbide, for that period of time necessary to form the bond phase, up to about 50 hours in some cases.

After recovering the fired reaction-bonded silicon carbide article, its abrasion resistance is tested on a Falex Air Jet Erosion Machine using a test based on ASTM G-76-83, entitled "Standard Practice for Conducting Tests by Solid Particle Impingement Using Gas Jets", with a 15° angle between the nozzle axis and the specimen. The weight loss due to erosion is measured periodically over time. When the erosion is continued for 20 min. and the weight loss measured at the end of that period, the test is referred to herein as "The Standard Erosion Test".

The oxidation resistance of the reaction-bonded silicon carbide article is measured by determining the increase in weight and volume of a standard size sample exposed to superheated steam for a prescribed period of time in accordance with ASTM C-863-77, entitled "Standard Recommended Practice for Evaluating Oxidation Resistance of Silicon Carbide Refractories at Elevated Temperatures".

The bending resistance, also called the modulus of rupture, of the reaction-bonded article can be determined by the three-point method specified in ASTM C-133-81, entitled "Tests for Cold Crush Strength and Modulus of Rupture of Refractory Brick and Shapes".

The density and porosity of the reaction-bonded article are determined by methods well known to those skilled in the art. The chemical and phase compositions of the various components of the reaction-bonded refractory article are determined by chemical and X-ray diffraction analysis.

The aforesaid tests and methods are employed to evaluate the properties of the reaction-bonded silicon carbide articles produced according to the following Examples, which represent preferred embodiments of this invention. The same tests and methods are employed to evaluate the properties of a benchmark reaction-bonded silicon carbide refractory of the prior art, viz. CAST REFRAX®3349 refractory, which is sold in commerce by The Carborundum Company, Niagara Falls, N.Y.

EXAMPLE 1

A raw batch containing the following solids is prepared:

| Component | Amount (wt %) |
| --- | --- |
| Silicon carbide[a] | 79 |
| Silicon[b] | 7 |
| Fine alumina | 10 |
| Silica | 4 |
|  | 100 |

[a]The silicon carbide consists of a mixture of sizes, all 18 mesh (U.S. Standard Sieve) and finer.
[b]600 mesh (U.S. Standard Sieve) and finer The raw batch solids are combined with a vehicle which comprises 5 parts by weight water and 0.1 part by weight Darvan brand deflocculant per 100 parts by weight solids. After mixing the components, a plaster mold having openings of 9 inches×4.5 inches×X 1 inch is filled with the raw batch mixture. After standing for about 2 hours, a cast green body with the aforestated dimensions is removed from the mold and dried. The green body is then fired in the muffle of a gas-fired kiln under a nitrogen atmosphere at 1400° C. for about 12 hrs. and subsequently allowed to cool to room temperature.

The reaction-bonded silicon carbide article of Example 1 is sectioned perpendicular to the 1 in. (25 mm) dimension with a diamond saw into two surface and three core fractions about 5 cm×5 cm×~4–5 mm thick for testing. The as-fired surfaces of the two surface sections, as well as the as-fired surface of a CAST REFRAX® 3349 refractory sample are subjected to the abrasion resistance test based on ASTM G-76-83 described above. The results appear in FIG. 1. The Standard Erosion Test results are about 70 mg weight loss from the CAST REFRAX 3349 refractory material, but only about 40 mg weight loss from the refractory article of this invention.

In similar fashion, the major surfaces of the three core sections from the refractory article of this invention and the surfaces of core sections of CAST REFRAX® 3349 refractory are subjected to the same abrasion resistance test. The results appear in FIG. 2. The Standard Erosion Test results are 60–80 mg weight loss from the CAST REFRAX 3349 refractory material, but only about 20 mg weight loss from the refractory article of this invention (the three surfaces of the Ex. 1 core samples are obtained 10.6 mm, 5.6 mm, and 15.6 mm from one of the fired surfaces, uppermost to lowermost curve in FIG. 2, respectively). The generally poorer abrasion resistance of the as-fired surface sections is believed to be due to the higher roughness of those as-fired surfaces compared with the sawed surfaces of the core sections.

In another test of abrasion resistance in which the surfaces of the 1 inch thick refractory article of Ex. 1 and CAST REFRAX® 3349 refractory are subjected for 5 min to a 60 psi blast of 0.18 mm and finer brown fused alumina blasting media from a 0.25 inch dia. nozzle held at 90° 3 inches from the surface of the sample, the CAST REFRAX 3349 suffers a weight loss of 100.8 g, while the refractory material of this invention loses only 15.6 g.

In a test of oxidation resistance based on ASTM C-863-77, i.e., after 500 hrs at 1100° C. under steam, samples of the refractory article of Ex. 1 and CAST REFRAX 3349 refractory increased in volume by 2–3% and >15%, respectively.

Figure 2:
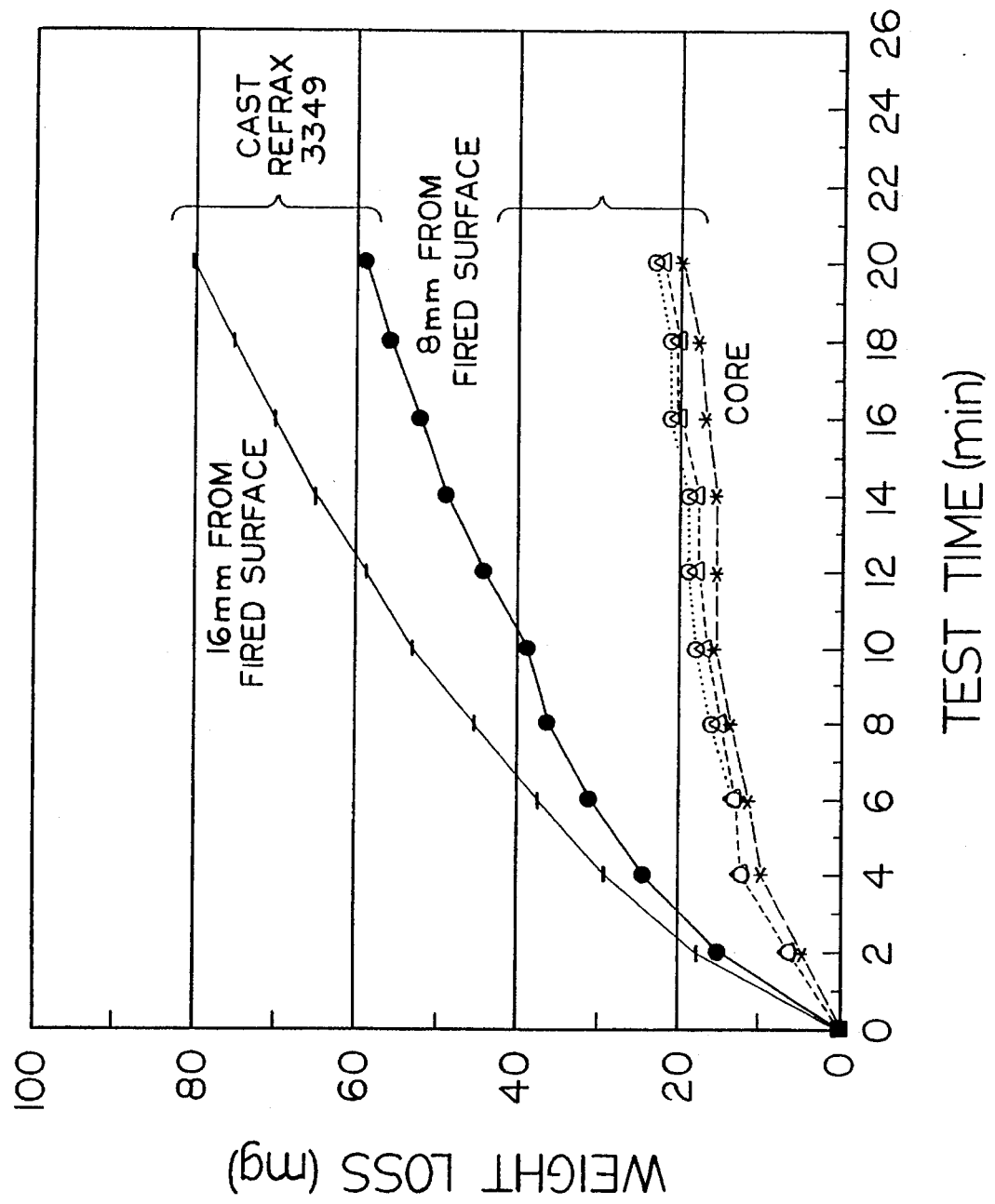
FIG. 2 is a graph showing the abrasion resistance of the surfaces of core samples cut from a reaction-bonded silicon carbide article of this invention and a benchmark reaction-bonded silicon carbide article of the prior art.

The uniformity of the properties of the refractory article of Ex. 1, compared against the benchmark CAST REFRAX® 3349 refractory material, is illustrated in the abrasion resistance tests of FIGS. 1 and 2 and in other studies. For example, the densities of the fired surface sections and core sections of the refractory article of Ex. 1 vary in the narrow range between 2.78 and 2.8 g/cm$^3$, whereas surface and core sections of CAST REFRAX 3349 refractory vary in density from 2.5 to 2.7 g/cm$^3$. Also, the porosity of the surface and core sections of the refractory article of Ex. 1 vary only slightly, between 7 percent by volume (vol % hereinafter) and 8 vol %, and the modulus of rupture of the surface and core sections remains the same at 10 Kpsi, while the surface and core sections uniformly contain 23 wt % bond phase.

The bond phase in both the surface and core sections of the refractory article of Ex. 1 is found to contain appreciable amounts, i.e., at least about 30 wt %, of both silicon oxynitride and alumina. The surface sections also contain a significant amount of sialon. The free silicon contents of the five sections of the refractory article of this invention are all in the narrow range between 0.19 wt % and 0.21 wt %. In contrast the free silicon contents in similar sections of CAST REFRAX 3349 refractory cover the broad range between 0.14 wt % to 2.59 wt %.

EXAMPLE 2

A pourable raw batch is prepared containing the following solids:

| Component | Amount (wt %) |
| --- | --- |
| Silicon carbide[a] | 76.8 |
| Silicon | 7.1 |
| Fine alumina | 12.1 |
| Silica | 4.0 |
| | 100.0 |

[a]The silicon carbide consists of 34 mesh, U.S. Standard Sieve, and finer.

The raw batch solids are combined with a vehicle which comprises, per 100 parts solids by weight, 11.2 parts water and 0.1 part DARVAN brand deflocculant. The raw batch is processed by pouring it into a plaster mold. The resultant green body, which is 0.5 in. thick is dried and then fired as described in Example 1.

The reaction-bonded silicon carbide refractory article which is recovered after firing is found to have a density of 2.70 g/cm$^3$, porosity of 11.5 vol %, and modulus of rupture (3-point) 12 Kpsi. The modulus of rupture at 1350° C. is 8 Kpsi.

EXAMPLE 3

A raw batch intended to be shaped into a green body under pressure in a nonporous mold is prepared containing the following solids:

| Component | Amount (wt %) |
| --- | --- |
| Silicon carbide | 75.4 |
| Silicon | 13.9 |
| Fine alumina | 8.6 |
| Silica | 2.1 |
| | 100.0 |

The raw batch solids are combined with a vehicle which comprises, per 100 parts solids by weight, 4.3 parts lignone and 1.8 parts water. The raw batch in a mold is pressed at 5 Kpsi into a green body which is dried and then fired as described in Example 1.

It is not the intent that the scope of this invention be limited to the specific embodiments disclosed hereinabove. Rather, the invention is limited only by the scope of the following claims.

I claim:

1. A raw batch for producing a reaction-bonded silicon carbide refractory article, said raw batch comprising between about 88 wt % and about 98.5 wt % solids and between about 1.5 wt % and about 12 wt % vehicle, said solids including about 60 wt % to about 85 wt % silicon carbide, about 5 wt % to about 16 wt % silicon, about 5 wt % to about 14 wt % alumina, and about 1 wt % to about 7 wt % silica.

2. The raw batch of claim 1 wherein said solids include about 65 wt % to about 80 wt % silicon carbide, about 7 wt % to about 14 wt % silicon, about 8 wt % to about 11 wt % alumina, and about 2 wt % to about 4 wt % silica.

3. The raw batch of claim 1 wherein the silicon carbide comprises primarily the alpha polymorph and includes a mixture of silicon carbide grains having different particle sizes, none of which exceed about 5 mm in size.

4. The raw batch of claim 1 wherein the silicon comprises particles having sizes in the range of about 74 µm and finer.

5. The raw batch of claim 1 wherein the alumina is reactive alumina having a surface area of at least about 2 $m^2/g$.

6. The raw batch of claim 1 wherein the silica is fume silica.

7. The raw batch of claim 6 wherein the silica has a surface area of about 20–24 $m^2/g$.

8. The raw batch of claim 1 wherein the content of silicon carbide s about 79 wt %, the silicon about 7 wt %, the alumina about 10 wt %, and the silica about 4 wt %.

9. A raw batch for producing a reaction-bonded silicon carbide refractory article, said raw batch comprising between about 88 wt % and about 98.5 wt % solids and between about 1.5 wt % and about 12 wt % vehicle, said solids including about 60 wt % to about 85 wt % silicon carbide, about 5 wt % to about 16 wt % silicon, about 5 wt % to about 14 wt % alumina, and about 1 wt % to about 7 wt % silica, said raw batch being capable of yielding a reaction-bonded silicon carbide refractory article comprising a silicon carbide phase and a bond phase, said silicon carbide phase comprising between about 65 wt % and about 85 wt % of the article, said bond phase comprising about 15 wt % to about 35 wt % of the article, said bond phase comprising at least about 30 wt % of both silicon oxynitride and at least about 30 wt % of alumina.

10. The raw batch of claim 6 wherein the refractory article exhibits a modulus of rupture greater than about 1000 psi.

* * * * *